(12) United States Patent
Muljono

(10) Patent No.: US 6,430,697 B1
(45) Date of Patent: Aug. 6, 2002

(54) METHOD AND APPARATUS FOR REDUCING DATA RETURN LATENCY OF A SOURCE SYNCHRONOUS DATA BUS BY DETECTING A LATE STROBE AND ENABLING A BYPASS PATH

(75) Inventor: Harry Muljono, Union City, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/312,154

(22) Filed: May 14, 1999

(51) Int. Cl.[7] .............................. G06F 1/04; G06F 3/00
(52) U.S. Cl. .......................... 713/600; 710/35; 710/60; 713/503
(58) Field of Search ................................ 713/400, 401, 713/600; 710/33, 34, 35, 58, 61

(56) References Cited

U.S. PATENT DOCUMENTS

| | | | |
|---|---|---|---|
| 5,159,679 A | * 10/1992 | Culley | 710/59 |
| 5,652,724 A | * 7/1997 | Manning | 365/189.05 |
| 5,706,484 A | 1/1998 | Mozdzen et al. | |
| 5,723,995 A | 3/1998 | Mozdzen et al. | |
| 5,774,001 A | 6/1998 | Mozdzen et al. | |
| 5,812,488 A | * 9/1998 | Zagar et al. | 365/233 |
| 6,044,417 A | 3/2000 | Muljono et al. | |
| 6,092,212 A | 6/2000 | Muljono et al. | |
| 6,247,136 B1 | 6/2001 | MacWilliams et al. | |
| 6,288,563 B1 | 9/2001 | Muljono et al. | |
| 6,311,285 B1 | 10/2001 | Rodriguez et al. | |

* cited by examiner

Primary Examiner—Thomas M. Heckler
(74) Attorney, Agent, or Firm—Jeffrey S. Draeger

(57) ABSTRACT

A method and apparatus for reducing data return latency of a source synchronous data bus by detecting a late strobe and enabling a bypass path. A disclosed apparatus includes a core portion clocked by a core clock and an interface circuit. The interface circuit is coupled to deliver a burst cycle to said core portion. The burst cycle includes a set of sequentially delivered bits that are transmitted with corresponding sequential edges of a transfer clock. Each bit of the burst cycle is delivered either via one of a set of receiving latches coupled in parallel to a data input or via a bypass path that bypasses the set of receiving latches.

20 Claims, 5 Drawing Sheets

METHOD AND APPARATUS FOR REDUCING DATA RETURN LATENCY OF A SOURCE SYNCHRONOUS DATA BUS BY DETECTING A LATE STROBE AND ENABLING A BYPASS PATH

BACKGROUND

1. Field of the Disclosure

The present disclosure pertains to the field of signal transfer between components. More particularly, the present disclosure pertains to receiving and synchronizing signals that are transmitted in a source synchronous manner. In some cases, the signals may be transmitted at various frequency ratios with respect to a core frequency.

2. Description of Related Art

One limitation on the throughput of a computer or other processing system is the interface between integrated circuits and/or other components in the system. Interface circuits often provide synchronization between components operating with different clocking signals or at different clocking frequencies. Improved interface circuitry may allow faster signaling between various components.

In some cases, buses between components are unable to transfer data as rapidly as a component produces or requests data. One prior art mechanism for dealing with this problem is to provide a bus interface that operates at a lower frequency than a core portion of the component. For example, a number of Intel Pentium® Processors available from Intel Corporation of Santa Clara, Calif., have a core that operates at either even fractional multiplier (e.g., a 1:2, 1:3, etc., font side bus to core frequency ratio) or an odd fractional multiplier (e.g., a 2:3, 2:5, etc., front side bus to core frequency ratio). These processors, however, generally do not employ a source synchronous scheme for the front side interface with the system bus, nor do they employ a source synchronous bus that operates at an odd bus to core frequency ratio. The interface with the system bus may be referred to as a front side bus as a back side bus is typically an interface to a cache memory.

Some prior art processors include back side buses employing source synchronous signaling. In fact, such source synchronous signaling has been accomplished using even fractions (e.g., 1:2, 1:3, etc.) of the core clock frequency. One example is the Intel Pentium® II processor also available from Intel Corporation. In such prior art source synchronous signaling systems, data and one or more transfer clocks (also referred to as "strobes") are transmitted together.

One prior art approach to receiving and synchronizing source synchronous signals that may be used where the transmit clock operates at a different frequency than the core clock of the receiving device is shown in FIG. 1. In this approach, a set of deskew latches 110 receive data chunks from a data bus 105. In FIG. 1, only one data line and one corresponding set of latches is illustrated; however, these items are typically replicated to form a multi-bit bus.

STROBE and STROBE# signals from signal lines 115 and 120 pass through input buffers 125 and enter a latch control circuit 130. The latch control circuit 130 provides latch enable signals AEN, BEN, CEN, and DEN respectively on signal lines 135, 136, 137, and 138. The latch control circuit 130 generates these enable signals so that sequentially delivered data bits (e.g., from a burst cycle) are latched by deskew latches 112, 116, 114, and 118 in that order. To accomplish this, the latch control circuit 130 includes a STROBE triggered latch control circuit 132 that is a one bit counter triggered on STROBE to alternate selecting deskew latches 112 and 116. A STROBE# triggered latch control circuit 134 may be a one bit counter triggered on STROBE# to alternate selecting deskew latches 114 and 118. Accordingly, the circuit 132 alternates between capturing data with latches 112 and 114 on rising edges of strobe, and the circuit 134 alternates between capturing data with latches 116 and 118 on rising edges of STROBE#.

A selection control circuit 150 controls a selector circuit 140 (e.g., a multiplexer). The selection control circuit 150 provides a MUXSEL signal on a signal line 152 to select data from the deskew latches 110 to be driven to a core latch 160. The MUXSEL signal is driven by core-clocked logic that anticipates the return of data based on when requests are made and knowledge of the data return latency. The MUXSEL signal sequentially selects the four deskew latches to provide the data received from the data bus 105 to the core latch 160 in the desired order.

In this arrangement, timing constraints may affect the ability of the core to latch data signals received from the data bus 105. Typically, buffering is employed to receive signals in both the case of the data bus (buffer 107) and the strobe signals (buffers 125). Additionally, the latch control circuit 130 introduces delay into the strobe path. Since matching clock (strobe) and data signal timing is typically an important facet of source synchronous communication since it impacts the burst rate, a delay match circuit 109 may be introduced to match the delay of the latch control circuit 130 and assist in providing the data and the clocking signals to the deskew latches 110 approximately simultaneously.

Thus, data from the data bus 105 passes through a lengthy path including the buffer 107, the delay match circuit 109, a deskew latch, and the selector circuit 140 before the core latch 160 is reached. This prior art technique may not provide a sufficiently low delay path to the core for data received from the data bus in a source synchronous signaling environment. It may be especially advantageous to reduce this path and accordingly allow the core more time for processing of data signals received from the data bus as higher core and data transmission frequencies are achieved.

SUMMARY

A disclosed apparatus includes a core portion clocked by a core clock and an interface circuit. The interface circuit is coupled to deliver a burst cycle to said core portion. The burst cycle includes a set of sequentially delivered bits that are transmitted with corresponding sequential edges of a transfer clock. Each bit of the burst cycle is delivered either via one of a set of receiving latches coupled in parallel to a data input or via a bypass path that bypasses the set of receiving latches.

BRIEF DESCRIPTION OF THE FIGURES

The present invention is illustrated by way of example and not limitation in the figures of the accompanying drawings.

DETAILED DESCRIPTION

The following description provides a method and apparatus for reducing data return latency of a source synchronous data bus by detecting a late strobe and enabling a bypass path. In the following description, numerous specific details such as signal names, signal encodings, bus agent types, and logic partitioning/integration choices are set forth in order to provide a more thorough understanding of the present invention. It will be appreciated, however, by one skilled in the art that the invention may be practiced without such specific details. In other instances, control structures and gate level circuits have not been shown in detail in order not to obscure the invention. Those of ordinary skill in the art, with the included descriptions, will be able to implement the necessary logic circuits without undue experimentation.

A source synchronous interface implemented using the disclosed techniques includes a bypass path for bypassing a plurality of latches that may be used as deskew latches. In some embodiments, the bypass path may ease timing constraints on a critical bus-to-core path for data signals. In some embodiments the bypass path may be used in conjunction with source synchronous signaling at various core clock to data transfer rate ratios, including odd fractional ratios. Such circuitry may advantageously allow faster source synchronous signal transmission due to the improved critical path and/or may allow faster core operation due to the ability to use more or different frequency ratios. Additionally, such circuitry may preserve the ability to operate at lower frequencies than a maximum operational frequency without causing race conditions to occur.

Figure 1:
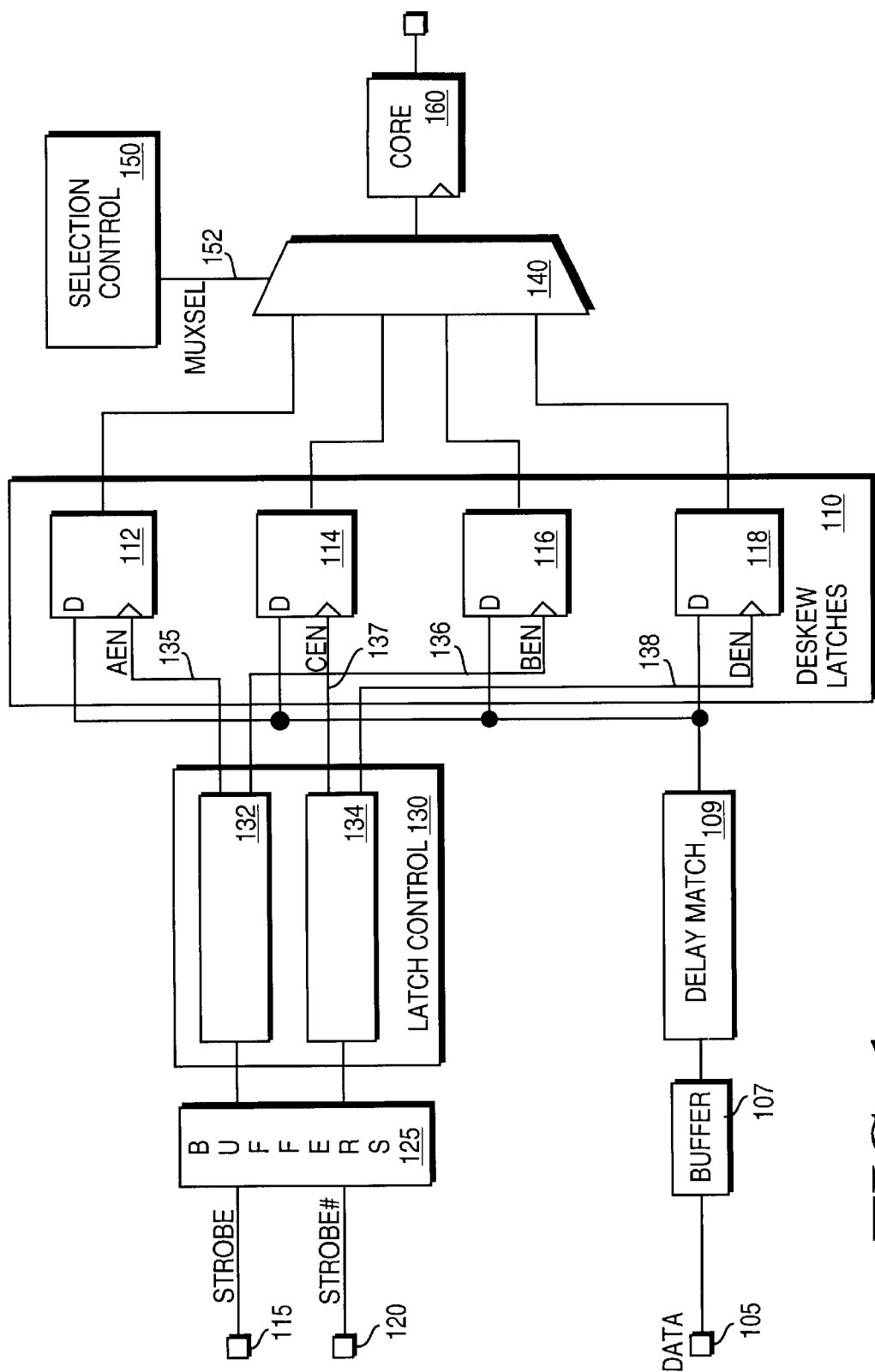
FIG. 1 illustrates a prior art system having a source synchronous bus architecture and employing deskew latches to couple data from a data bus to core circuitry.
Figure 2:
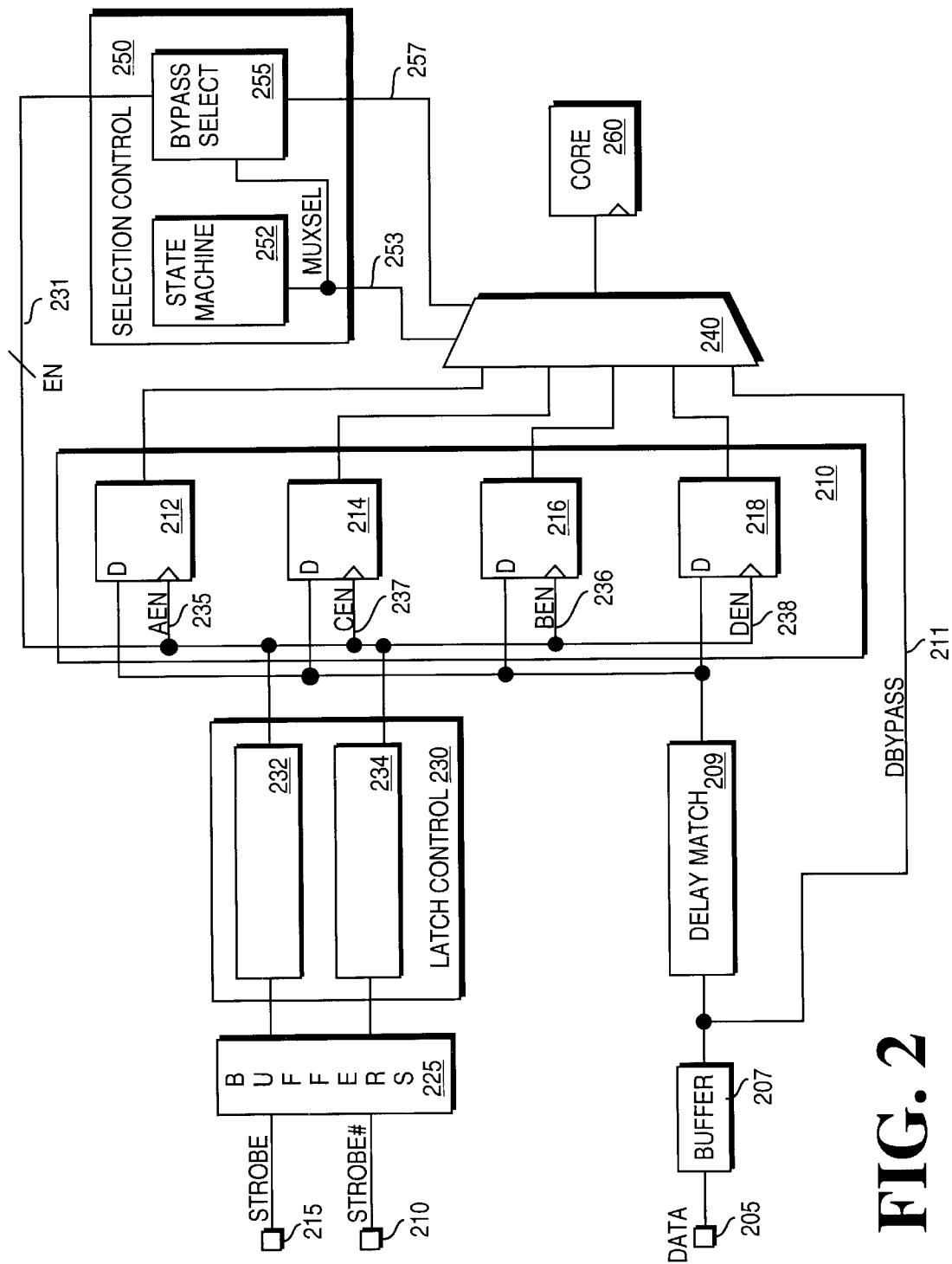
FIG. 2 illustrates one embodiment of a system employing both deskew latches and a bypass path to couple a data from data bus to core circuitry.

FIG. 2 illustrates one embodiment of a source synchronous interface circuit utilizing a bypass path. Similarly to the prior art approach illustrated in FIG. 1, the embodiment of FIG. 2 includes a set of deskew latches 210 that may receive sequentially delivered data chunks from a data bus 205. STROBE and STROBE# signals from signal lines 215 and 220 pass through input buffers 225 and enter a latch control circuit 230. The latch control circuit 230 provides latch enable signals AEN, BEN, CEN, and DEN on an enable bus (EN) 231 and respectively on signal lines 235, 236, 237, and 238.

The latch control circuit 230 generates these enable signals so that sequentially delivered data bits (e.g., from a burst cycle) are latched by deskew latches 212, 216, 214, and 218 in that order. A STROBE triggered latch control circuit 232 may be a one bit counter that is triggered on STROBE. A STROBE# triggered latch control circuit 234 may be a one bit counter triggered on STROBE#. Accordingly, the circuit 232 alternates between capturing data with latches 212 and 214 on rising edges of strobe and the circuit 234 alternates between capturing data with latches 216 and 218 on rising edges of STROBE# as discussed with respect to FIG. 1.

As is true in the prior art approach, a selection control circuit 250 is coupled to control a selector circuit 240 such as a multiplexer; however, the selection control circuit 250 of the embodiment of FIG. 2 operates differently than the selection control circuitry of the prior art and may drive more or different control signals than the selection control circuitry of the prior art. The selection control circuit 250 in FIG. 2 may choose a bypass path 211 (DBYPASS) rather than the output of one of the deskew latches 210.

In the illustrated embodiment, the bypass path 211 is coupled to receive the data input from the data bus 205 after an input buffer 207 but prior to a delay match circuit 209, bypassing the set of deskew latches 210. Therefore, the bypass path 211 significantly shortens the path from the data bus 205 to a core latch 260. In order to improve timing of the delivery of data to the core, the selection control circuit 250 selects either the bypass path or the deskew latches depending on a timing relationship between a core select signal (MUXSEL) and the received transfer clock(s) (STROBE/STROBE#) or equivalently a derivative thereof such as the enable signals (AEN, BEN, CEN, DEN).

To perform its selection, the selection control circuit 250 utilizes a bypass select circuit 255 and a state machine 252. The bypass select circuit 255 is coupled to control the selector circuit 240 via a signal line 257 and the state machine 252 is coupled to control the selector circuit 240 via a signal line 253. The state machine 252 is clocked by a core clock signal and receives inputs including a data request signal, a frequency select signal, and a frequency ratio select. The data request signal indicates that a core portion of logic has requested data that will be returned over the data bus 205. The state machine 252 uses the frequency and frequency ratio information and memory return latency information (either hard-coded or later programmed or transferred into the state machine) to determine when the sequence of data will return on the data bus 205. The state machine 252 begins toggling the MUXSEL signal on signal line 253 when data arrives over the data bus 205.

The bypass select circuit 255 receives the enable signals generated by the latch control circuit 230 as well as the MUXSEL signal(s) generated by the state machine 252. As previously mentioned, depending on a timing relationship between the enable signals and the MUXSEL signal, the bypass select circuit 255 selects either the bypass path 211 or the output of the deskew latch indicated by MUXSEL. In one embodiment, if the MUXSEL signal for a particular deskew latch (e.g., latch 212) arrives before the enable (e.g., AEN) for that deskew latch causes that deskew latch to latch the data, the bypass path 211 is selected. The MUXSEL signal arriving first indicates that the core is ready for the data to be received over the data bus 205. Passing data through the delay match circuit 209 and the deskew latches 210 when the core is waiting for such data otherwise may disadvantageously delay the delivery of data to the core. Thus, the bypass select circuit assists in detecting when the core is ready to receive incoming data and expedites delivery of such data via the bypass path 211.

In cases where the appropriate enable signal arrives before the corresponding MUXSEL signal is generated, the bypass path 211 is not enabled in this embodiment, but rather the data passes through one of the deskew latches 210 and through the selector circuit 240. Since the selector circuit 240 is controlled by core clock signals, data does not race through to the core latch 260 even if it is available at the deskew latch output prior to the core latch 260 being ready for the data. Thus, race conditions may be avoided despite the use of a bypass path that may improve critical timings to core latches.

The bypass path may be particularly valuable due to the asynchronous nature of the data and strobe signals in some embodiments and due to expected variations in timing in the incoming data. For example, the incoming data may arrive earlier or later than the strobe signals depending on processing variations, temperature, or other factors affecting the memory or other device providing the data. In low frequency or low data return latency cases, the data is likely to arrive before the MUXSEL signal is generated. In high latency or high frequency cases, data is likely to arrive after the MUXSEL signal is generated, making the strobe signal path critical. Thus, the ability to bypass the deskew latches may allow more aggressive timings to be used in cases where the strobe signals may otherwise become critical. The ability to bypass the deskew latches may also provide increased tolerance for variations in data timing.

In addition, the use of a bypass path may allow timing improvements where data return latencies slightly exceed a round number of core clock cycles. For example, if the data return latency for a particular memory access is 7.1 cycles, the bypass path may allow the data to be used in the seventh clock cycle, rather than waiting until eighth cycle. Thus, by directly providing the data to the core without the delay associated with the strobe signal path, the bypass path may improve performance.

Figure 3A:
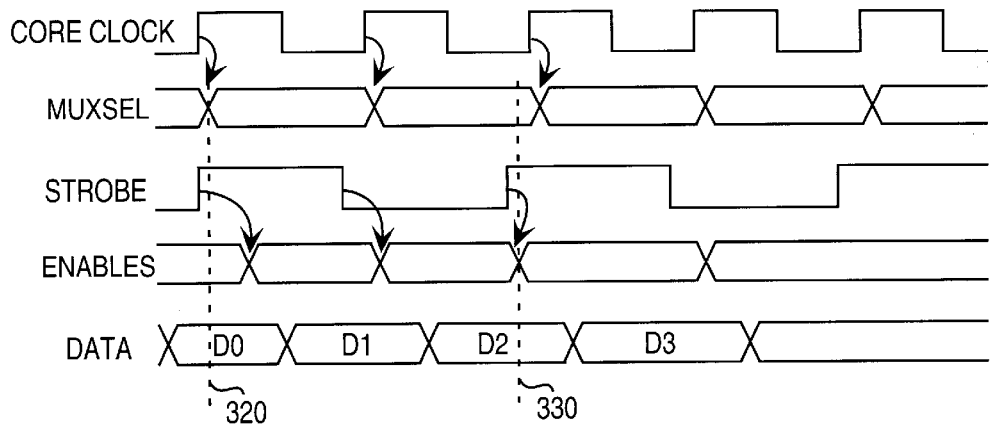
FIG. 3A illustrates a timing diagram showing conditions under which the bypass path may be selected and conditions under which the deskew latches may be selected for one embodiment.

FIG. 3A illustrates idealized waveforms showing operation of one embodiment of the circuitry shown in FIG. 2. In FIG. 3A, the core frequency and the transfer rate are the same (i.e., the ratio is 1:1). As referred to herein, the (data) "transfer rate," or the "transfer frequency" is twice the actual frequency of the transfer clock signals (STROBE and STROBE#) since data is transferred on both rising and falling edges of the strobe signals. Only the STROBE signal is illustrated, but it is to be understood that the STROBE# signal (if two transfer clock signals are used) is the complement of the STROBE signal.

As is illustrated in FIG. 3A, the MUXSEL signal is triggered off (generated by a latch clocked by) the core clock signal. Additionally, the enables (e.g., AEN, BEN, CEN, DEN) are triggered off either STROBE or STROBE#. Therefore, if the strobe signals arrive either early or late, the timing relationship between MUXSEL and the enable signals is affected. Data is typically centered around an edge transition of one of the strobe signals and therefore is typically latched by a strobe signal or a derivative thereof.

In the prior art approach, data is first received by a deskew latch (e.g., one of deskew latches 110 in FIG. 1) when an incoming strobe signal triggers the latch through control circuit 130. Thereafter, the incoming data is passed to the core latch 160 after the MUXSEL signal is generated. In the embodiment of FIG. 2, if the MUXSEL signal is generated before the strobe signals are received, then the bypass path 211 may be utilized. Therefore, at marker 320, where MUXSEL transitions prior to the enables transitioning, the bypass path 211 may be enabled. In contrast, at marker 330, where the enables transition prior to MUXSEL, the appropriate deskew latch is selected through the selector circuit 140. Notably, the enables typically do not swap leading and lagging the MUXSEL signal during normal operation in even fractional transfer rate to core frequency ratios; however, both leading and lagging situations are shown in FIG. 3A for illustrative purposes.

Figure 3B:
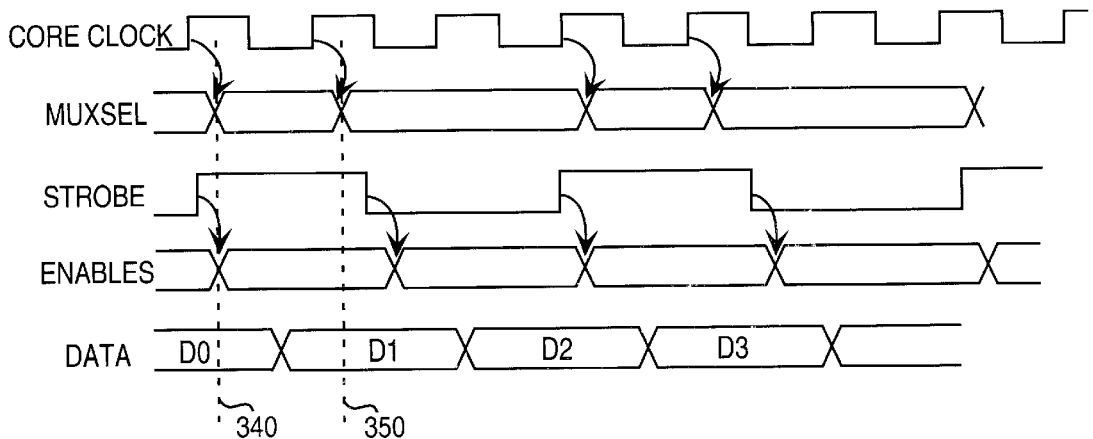
FIG. 3B is a timing diagram illustrating the use of the deskew latches and the bypass path for one embodiment operating in an odd core to transfer clock frequency ratio.

FIG. 3B illustrates idealized waveforms for one embodiment of the circuit of FIG. 2 operating in an odd fractional transfer rate to core frequency ratio. In the example shown, the transfer rate is two-thirds the core clock frequency. Again, MUXSEL may transition before or after the enables. At marker 340, MUXSEL and the enables are triggered by clock edges that are ideally simultaneous much like the case in FIG. 3A. Therefore, subtle timing differences could cause either signal to precede the other. At marker 350, however, the idealized core clock edge responsible for generating MUXSEL leads the idealized strobe signal edge by one-half of a core clock cycle, making MUXSEL inherently likely to lead the enables. Accordingly, the bypass path 211 is likely to be selected in this case which repeats every other cycle when a two-thirds transfer rate to core clock frequency ratio is used.

Figure 4:
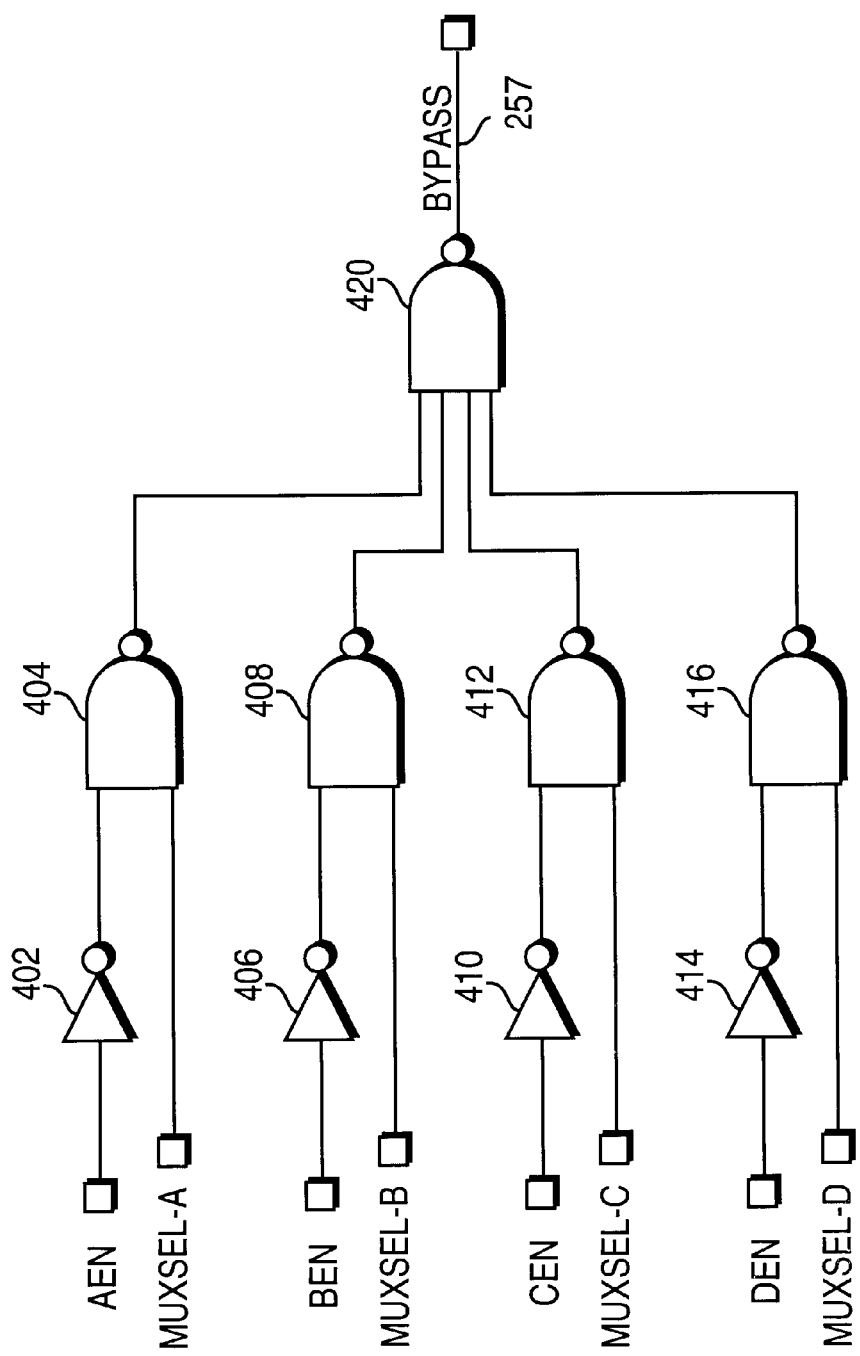
FIG. 4 illustrates one embodiment of the bypass select circuit 255 shown in FIG. 2.

FIG. 4 illustrates one embodiment of the bypass select circuit 255. In this embodiment, the BYPASS signal is generated when a particular MUXSEL signal is present and the corresponding enable signal is not present. Thus, an AND-OR function is formed by a two level NAND gate tree. AEN, inverted by an inverter 402, is coupled to a first input of a NAND gate 404, and MUXSEL-A (indicating an encoding understood by selector circuit 240 to select deskew latch 212 that is enabled by AEN) is coupled to a second input of the NAND gate 404. BEN, inverted by an inverter 406, is coupled to a first input of a NAND gate 408, and MUXSEL-B is coupled to a second input of the NAND gate 408. CEN, enabled by an inverter 410, is coupled to a first input of a NAND gate 412, and MUXSEL-C is coupled to a second input of the NAND gate 412. Finally, DEN, inverted by an inverter 414, is coupled to a first input of a NAND gate 416, and MUXSEL-D is coupled to a second input of the NAND gate 416. The output of NAND gates 404, 408, 412, and 416 are coupled to a four-input NAND gate 420 to generate the BYPASS signal which may be driven on signal line 257 of FIG. 2.

Notably, the four separate MUXSEL signals may be encoded in two bits or another number of bits since a larger number of deskew latches may be used in other embodiments. Additionally, the MUXSEL signals and the BYPASS signal may be encoded into a single control bus for the selector circuit 240 rather than being separated into MUXSEL and BYPASS signals.

Figure 5:
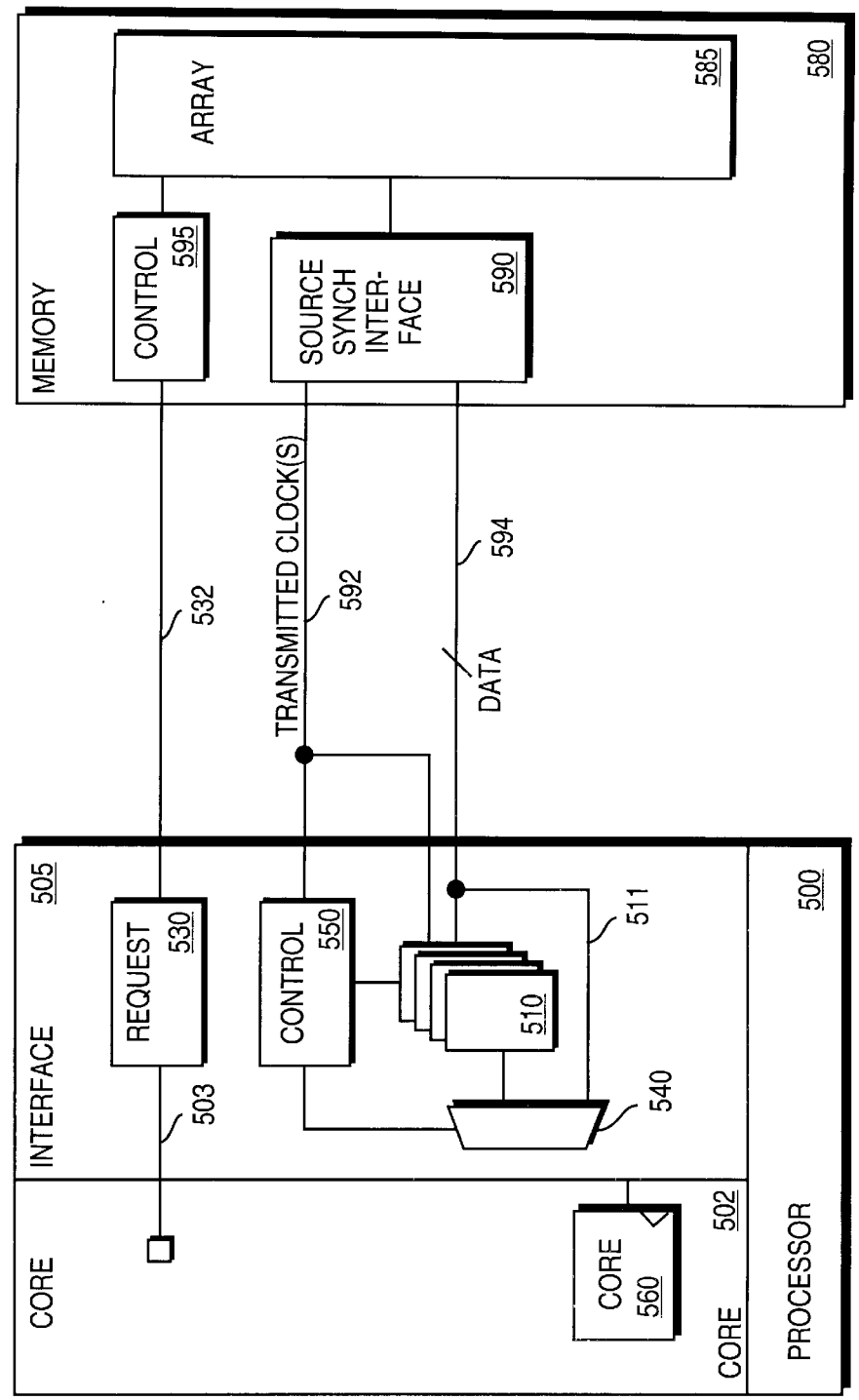
FIG. 5 illustrates one embodiment of a system utilizing a source synchronous bus architecture in which a bus agent receiving burst cycles includes deskew latches and a bypass path.

FIG. 5 illustrates one embodiment of a system employing a source synchronous bus architecture utilizing presently disclosed techniques. In this system, a processor 500 (a master device) includes a core portion 502. The core portion performs data processing and may from time to time request data via a request line 503. An interface circuit 505 controls generation of requests and receipt of corresponding data. A request circuit 530 passes the request from the core 502 to a memory 580 (or other slave device) via one or more signal lines 532.

The memory 580 receives the request via a control circuit 595 which retrieves data from an array 585 and forwards the data to a source synchronous interface circuit 590 for return to the processor. Data is returned to the processor using transmit clock(s) on signal line(s) 592 and a data bus 594. In one embodiment, the memory 580 is a cache memory such as a level two cache, and the interface between the memory 580 and the processor 500 is a back side bus reserved for communication between the memory 580 and the processor 500.

In the illustrated embodiment, the processor 500 includes a plurality of deskew latches 510, a bypass path 511, a selector circuit 540, and a control circuit 550. The control circuit 550 analyzes the timing relationship between the received transmit clocks (or signals such as enables derived therefrom) as well as a core clock triggered select signal, and selects either one of the deskew latches or the bypass path 511 accordingly. This selection may be performed as discussed with respect to the previously discussed embodiments. The output of the selector circuit 540 is then delivered to a core latch 560 so that the core may process the data requested.

Thus, a method and apparatus for reducing data return latency of a source synchronous data bus by detecting a late strobe and enabling a bypass path is disclosed. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. An apparatus comprising:
   a core portion clocked by a core clock; and
   an interface circuit coupled to deliver each bit of a burst cycle comprising a plurality of sequential data bits transmitted with corresponding sequential edges of a transfer clock to said core portion via either one of a plurality of receiving latches coupled in parallel to a data input or a bypass path that bypasses said plurality of receiving latches.

2. The apparatus of claim 1 wherein said core portion operates at a first frequency and wherein data is transferred at a transfer rate that is different than the first frequency.

3. The apparatus of claim 1 wherein said interface circuit selects said bypass path or one of said plurality of receiving latches depending on a timing relationship between said transfer clock and the core clock.

4. The apparatus of claim 3 wherein the timing relationship is determined by a first signal from a control circuit clocked by the core clock that selects one of said plurality of receiving latches and a second signal that is derived from the transfer clock.

5. The apparatus of claim 4 wherein the transfer clock is coupled to a clock input of said plurality of receiving latches and wherein the interface circuit selects the bypass path if said first signal is present prior to said second signal.

6. The apparatus of claim 5 wherein said interface circuit alternates between said plurality of receiving latches and said bypass path when said transfer clock operates at a transfer clock frequency which is an odd fraction of a core clock frequency of the core clock.

7. The apparatus of claim 1 further comprising:
   a strobe input buffer coupled to deliver said transfer clock to said interface circuit;
   a data input buffer coupled to deliver said burst cycle to said interface circuit;
   an enable generation circuit coupled to said strobe input buffer to generate enable signals derived from said transfer clock, the enable generation circuit being coupled to provide the enable signals to clock inputs for said plurality of receiving latches;
   a delay match circuit coupled to said data input buffer, the delay match circuit having a delay which approximates the delay of the enable generation circuit, wherein said bypass path is coupled to provide data from prior to said delay match circuit to said core portion.

8. A method comprising:
   receiving a plurality of data chunks and a transfer clock signal having a plurality of transfer clock edges, each transfer clock edge corresponding to a data chunk, each data chunk being received in one of a plurality of latches coupled in parallel;
   transferring each of said plurality of data chunks through one of a bypass path and said plurality of latches depending on when a transfer clock edge corresponding to each data chunks is received.

9. The method of claim 8 wherein transferring comprises:
   if a core generated multiplexer select signal for one of said plurality of latches is generated prior to said one of said plurality of latches being triggered by said clocking signal, then selecting said bypass path to bypass said plurality of latches;
   if one of said plurality of latches is triggered prior to the core generated multiplexer select signal, then selecting said one of said plurality of latches.

10. The method of claim 9 wherein transferring comprises alternating between said bypass path and said plurality of latches when said data is transferred at a transfer rate that is an odd fraction of a core clock frequency.

11. The method of claim 8 wherein a core clock frequency for core generated signals differs from a transfer rate at which the plurality of data chunks are received.

12. The method of claim 11 wherein the transfer rate is an odd fraction of the core clock frequency.

13. A processor having an interface comprising:
   a plurality of deskew latches, said plurality of deskew latches being coupled to sequentially receive a plurality of data items transmitted in a burst cycle, each of said plurality of deskew latches being coupled to store one data item per burst cycle;
   a bypass circuit coupled to receive said plurality of data items;
   a control circuit coupled to transfer said plurality of data items from said burst cycle to a core portion of said processor, said control circuit selecting between one of said plurality of deskew latches and said bypass circuit as a function of a timing relationship between a transmission clock received with the burst cycle and one or more core signals that select one of said plurality of deskew latches.

14. The processor of claim 13 wherein the control circuit selects said bypass path if a core select signal that selects one of said plurality of deskew latches is present prior to a corresponding transmission clock edge clocking one of said plurality of deskew latches.

15. The processor of claim 14 wherein said core portion of said processor operates at a core frequency and said plurality of data items are transferred at a second frequency that is an odd fraction of the core frequency.

16. A system comprising:
   a slave device to return a plurality of data items in a burst cycle with a transfer clock;
   a master device having a plurality of deskew latches and a bypass circuit, the plurality of deskew latches being coupled in parallel and therefore capable of receiving the burst cycle from said slave device, the master device having a core portion coupled to transfer each of said plurality of data items to a core portion via either one of said plurality of deskew latches or said bypass circuit.

17. The system of claim 16 wherein the core portion of the master device receives each data item from either the bypass circuit or the deskew latches depending on a timing relationship between a core clock signal and the transfer clock signal.

18. The system of claim 17 wherein the timing relationship is determined by a signal from a control circuit clocked by a core clock and a signal derived from said transfer clock.

19. The system of claim 17 wherein the core portion receives data from the bypass circuit if a core select signal is present prior to an enable signal derived from said transfer clock.

20. The system of claim 17 wherein said core portion operates at a first frequency and data is transferred with said transfer clock at transfer rate of a second frequency that is an odd fraction of said first frequency.

* * * * *

UNITED STATES PATENT AND TRADEMARK OFFICE
CERTIFICATE OF CORRECTION

PATENT NO. : 6,430,697 B1
DATED : August 6, 2002
INVENTOR(S) : Muljono

It is certified that error appears in the above-identified patent and that said Letters Patent is hereby corrected as shown below:

Column 2,
Line 62, after "couple", delete "a".
Line 62, after "from", insert -- a --.

Signed and Sealed this

Twenty-fourth Day of June, 2003

JAMES E. ROGAN
*Director of the United States Patent and Trademark Office*